United States Patent
Kobayashi

(10) Patent No.: US 7,233,881 B2
(45) Date of Patent: Jun. 19, 2007

(54) PHYSICAL QUANTITY MONITORING AND CONTROL SYSTEM AND PORTABLE INFORMATION TERMINAL USED FOR THE SAME

(75) Inventor: Ikutaro Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 10/854,274

(22) Filed: May 27, 2004

(65) Prior Publication Data

US 2004/0243355 A1    Dec. 2, 2004

(30) Foreign Application Priority Data

May 28, 2003 (JP) .............................. 2003-150063

(51) Int. Cl.
*G06F 15/00* (2006.01)
(52) U.S. Cl. ................ 702/188; 702/182; 702/189; 340/445
(58) Field of Classification Search ............. 702/31, 702/182, 188, 189; 340/511, 531, 539.26, 340/540, 572.1, 825.72, 870.17, 445
See application file for complete search history.

(56) References Cited

U.S. PATENT DOCUMENTS

| | | | |
|---|---|---|---|
| 5,745,049 A * | 4/1998 | Akiyama et al. ....... 340/870.17 |
| 5,862,803 A * | 1/1999 | Besson et al. ............... 600/508 |
| 6,031,455 A * | 2/2000 | Grube et al. ............. 340/539.26 |
| 6,329,904 B1 * | 12/2001 | Lamb ..................... 340/286.02 |
| 6,424,931 B1 * | 7/2002 | Sigmar et al. .............. 702/188 |
| 6,493,633 B2 * | 12/2002 | Baron et al. .................... 702/3 |
| 6,522,417 B1 * | 2/2003 | Kakigahara et al. ....... 358/1.15 |
| 6,603,405 B2 * | 8/2003 | Smith ......................... 340/905 |
| 6,617,964 B1 * | 9/2003 | Lamb ..................... 340/286.02 |
| 6,646,559 B2 * | 11/2003 | Smith ......................... 340/601 |
| 6,747,557 B1 * | 6/2004 | Petite et al. ................. 340/540 |
| 6,867,688 B2 * | 3/2005 | Lamb ..................... 340/286.02 |
| 6,914,525 B2 * | 7/2005 | Rao et al. ................... 340/531 |

FOREIGN PATENT DOCUMENTS

| | | |
|---|---|---|
| JP | 7-158940 | 6/1995 |
| JP | 2002-228497 | 8/2002 |

* cited by examiner

*Primary Examiner*—Carol S. W. Tsai
(74) *Attorney, Agent, or Firm*—Foley & Lardner LLP

(57) ABSTRACT

To enable indoor and outdoor physical conditions to be detected for very fine control thereof. Self-contained transmitting sensors 10-1 through 10-8 which monitor physical quantities and convert them into electrical data signals for radio-transmission are disposed in desired positions in housing. The wirelessly transmitted data signals are received by a portable information terminal 20 for controlling the operation of a device 30 to be controlled based upon the received information and its information history. By wearing a self-contained transmitting sensor 10-9 on a user 40 physical quantities such as temperature, humidity and illumination at a place in which the user is located can be controlled to desired values wherever the user moves.

12 Claims, 7 Drawing Sheets

PHYSICAL QUANTITY MONITORING AND CONTROL SYSTEM AND PORTABLE INFORMATION TERMINAL USED FOR THE SAME

FIELD OF THE INVENTION

The present invention relates to an environment condition monitoring and control system and in particular to an environment condition monitoring and control system which monitors various conditions in a natural or artificial environment in building for controlling them.

BACKGROUND OF THE INVENTION

There are various systems which monitor natural and artificial environmental conditions for controlling them. For example, an air-conditioning system monitors the temperature and humidity in each room of building for controlling them at desired presettings. In such an air-conditioning system, the temperature and humidity of each room is monitored by sensors and the monitor results are transmitted to a central control unit at which a control signal for an air-conditioner in each room is generated for controlling the temperature and humidity in each room to desired values.

In this case, the method of transmitting the monitor result of the temperature and the humidity in each room to the central control unit includes a technique using an existing private branch exchange (PBX) (refer to Patent document 1). Specifically, sensors are mounted on a telephone set in each room, so that monitor results of the sensors are transmitted to a computer in the central control unit via the telephone set, PBX and a modem.

There is also a system which detects the damages of a protective net for preventing rocks from falling which is provided on a slope along a road, so that they are alarmed to remote a control room (refer to Patent document 2). In this system, IC tags having displacement sensors incorporated therein are mounted on the falling rock preventive net or rocks, so that displacement data are wirelessly transmitted to the control room. An example in which a cellular phone is used as a wireless transmitter is disclosed.

[Patent Document 1]

Japanese Patent Kokai Publication No. JP-A-7-158940, pages 3 and 4, FIG. 1

[Patent Document 2]

Japanese Patent Kokai Publication No. JP-P2002-228497A, pages 2 and 3, FIG. 1

SUMMARY OF THE DISCLOSURE

Recently, PCs (personal computers) or portable information terminals (Cellular Phones or PDAs (Personal Digital Assistants)) have been used as front end devices of a telecommunication network which is represented by the Internet. They perform information transmitting and receiving functions by being operated by human being. As the networks will have prevailed into home or community and natural environment, it is expected that various sensors which are disposed in an artificial environment such as building or natural environment will be used as front end devices of the networks, so that information on the environment which is automatically transmitted by these sensors is collected and advantageously used.

PCs and portable information terminals take part in both receiving of information on various sensors and operating of various terminals and devices which are connected to the networks as controllers.

Since all networks are systems using existing private branch exchange in the cited Patent document 1 and are wired systems, the PCs and portable information terminals do not take part in receiving of the sensor information and operating of various devices. The functions of PCs and portable information terminals are not effectively used. Although displacement data from sensors are wirelessly transmitted by means of a cellular phone in the cited Patent document 2, the cellular phone is only used as a wireless transmitter in this technique. The cellular phone does not take part in any of receiving of sensor information and operating of various devices.

It is an object of the present invention to provide an environment condition monitoring and control system in which information on an environment which is transmitted from various sensors and/or information transmitting terminals which are disposed in a natural or artificial environment is collected by a PC or portable information terminal for operating various devices via a network, so that characteristics of the PC or portable terminal is effectively used.

According to an aspect of the present invention, a physical quantity monitoring and control system is characterized in that the system comprises sensor device having a sensor unit for detecting a physical quantity and a transmitter unit for wirelessly transmitting information on the detected physical quantity; and a portable information terminal which receives information transmitted from the wireless transmitter unit for generating a control signal for controlling operation conditions of an object to be controlled, which determine the physical quantity, based upon the received information.

The portable information terminal wirelessly transmits the control signal to the device to be controlled. The portable information terminal learns a scheme to determine the operation states based upon the received information and history of changes in the operation states. The portable information terminal comprises a display for displaying the received information and operation states of the object to be controlled based upon the received information.

According to another aspect, a portable information terminal of the present invention receives a physical quantity which is wirelessly transmitted from a sensor device for controlling the operation states of an object to be controlled, which determine the physical quantity, based upon the received information and is characterized in that the portable information terminal includes a unit for generating a control signal which controls the operation states of the object to be controlled based upon the received information.

The portable information terminal wirelessly transmits the control signal to the device to be controlled. The portable information terminal learns a scheme to determine the operation states based upon the received information and history of changes in the operation states. The portable information terminal comprises a display for displaying the received information operation states of the object to be controlled based upon the received information.

Operation of the Invention will be described. Information on various items of environment which is transmitted from sensors disposed in natural environment or artificial environment such as building is collected for controlling various devices to be controlled via a network.

PREFERRED EMBODIMENTS OF THE INVENTION

Figure 1:
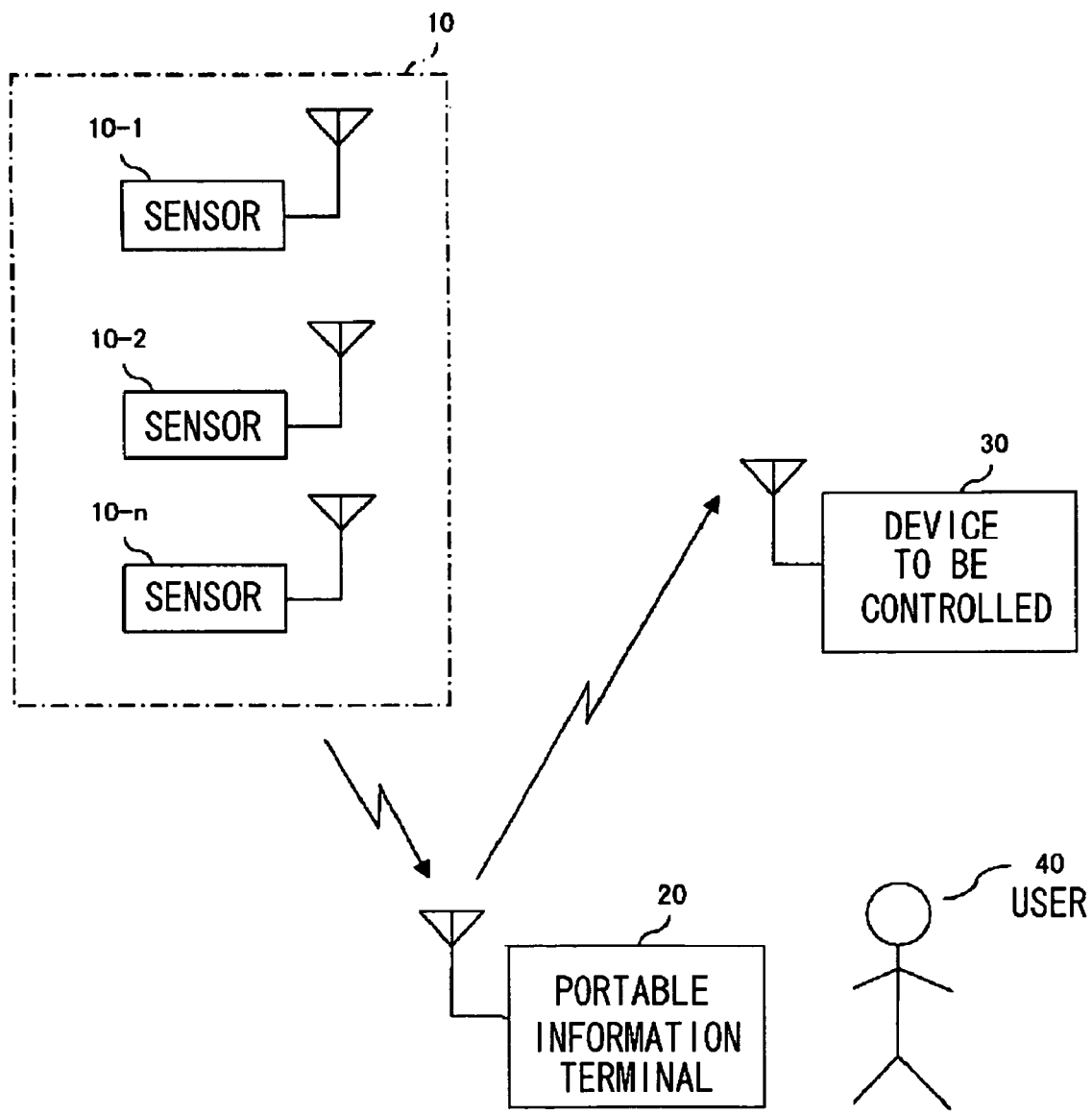
FIG. 1 is a view showing the configuration of one embodiment of the present invention.

Now, embodiments of the present invention will be described with reference to drawings. FIG. 1 is a system block view showing an embodiment of the present invention. Referring now to FIG. 1, a sensor group 10 comprising sensors 10-1 through 10-n wherein n denotes a natural number are mounted indoors in predetermined positions. The sensors 10 are capable of monitoring and measuring physical quantities such as temperatures and luminosity for converting them into electrical data signals and for wirelessly transmitting them. They are referred to as self-contained transmission sensors. They have power sources such as solar cells incorporated therein.

Figure 2:
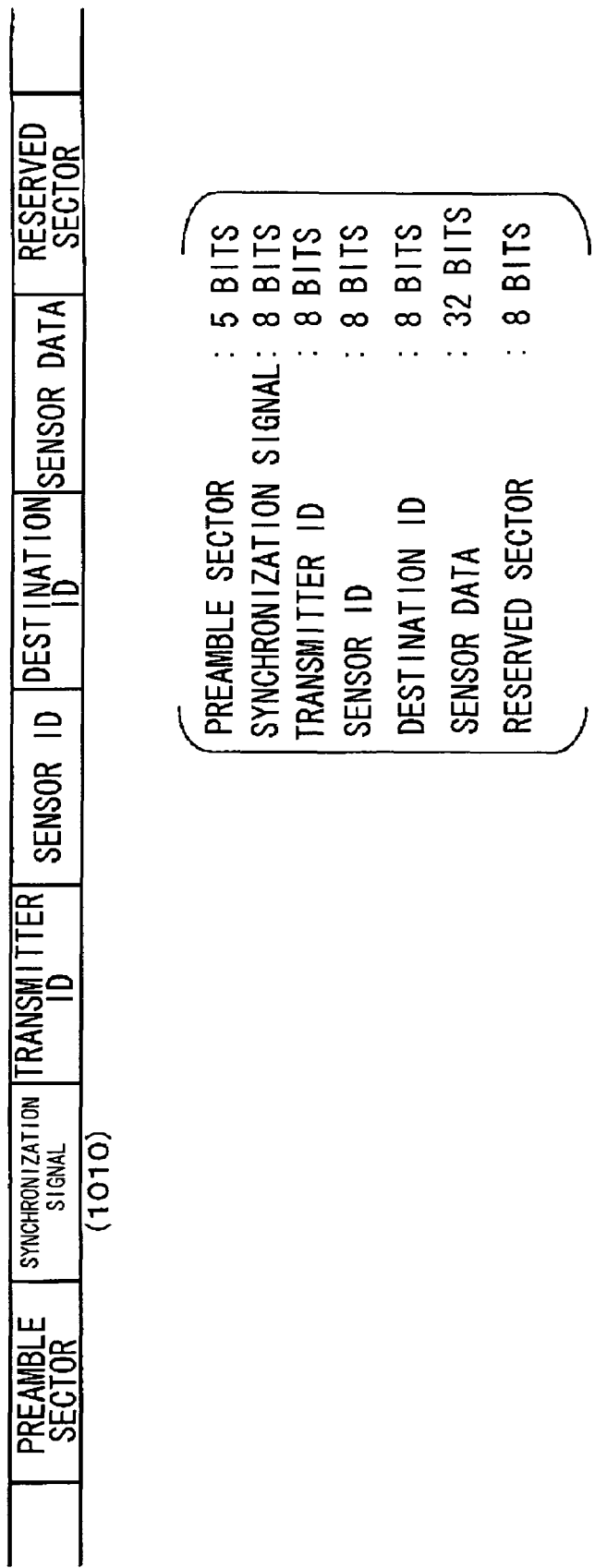
FIG. 2 is a diagram showing an example of the format of the signal of sensor information used in the embodiment of the present invention.

An electrical data signal which is transmitted by such a self-contained transmission sensor has such a frame format shown in FIG. 2 that it comprises a preamble sector, a synchronization signal sector for synchronization, a sensor ID which represents the kind of physical quantity which has been converted into a data signal, a transmitter ID which identifies any one of the self-contained transmission sensors 10-1 through 10-n , a destination ID for identifying the destination to which the signal is to be transmitted, a sensor data and a reserved sector.

Such data signals are wirelessly transmitted to a mobile or portable terminal (referred to as "portable terminal") 20 which is carried or worn by a user 40. The portable terminal 20 receives the data signals which are sensor information from the self-contained transmission sensors 10-1 through 10-n and displays the received signal on a display unit and/or controls the operation of a device 30 to be controlled based upon preset information or stored information. It is preferable that the portable terminal 20 be portable or wearable on the body. The portable terminal includes cellular phone or PDA (personal Digital Assistant) and the like. The wearable terminal includes wrist watch type information terminal or wearable computer.

Figure 3:
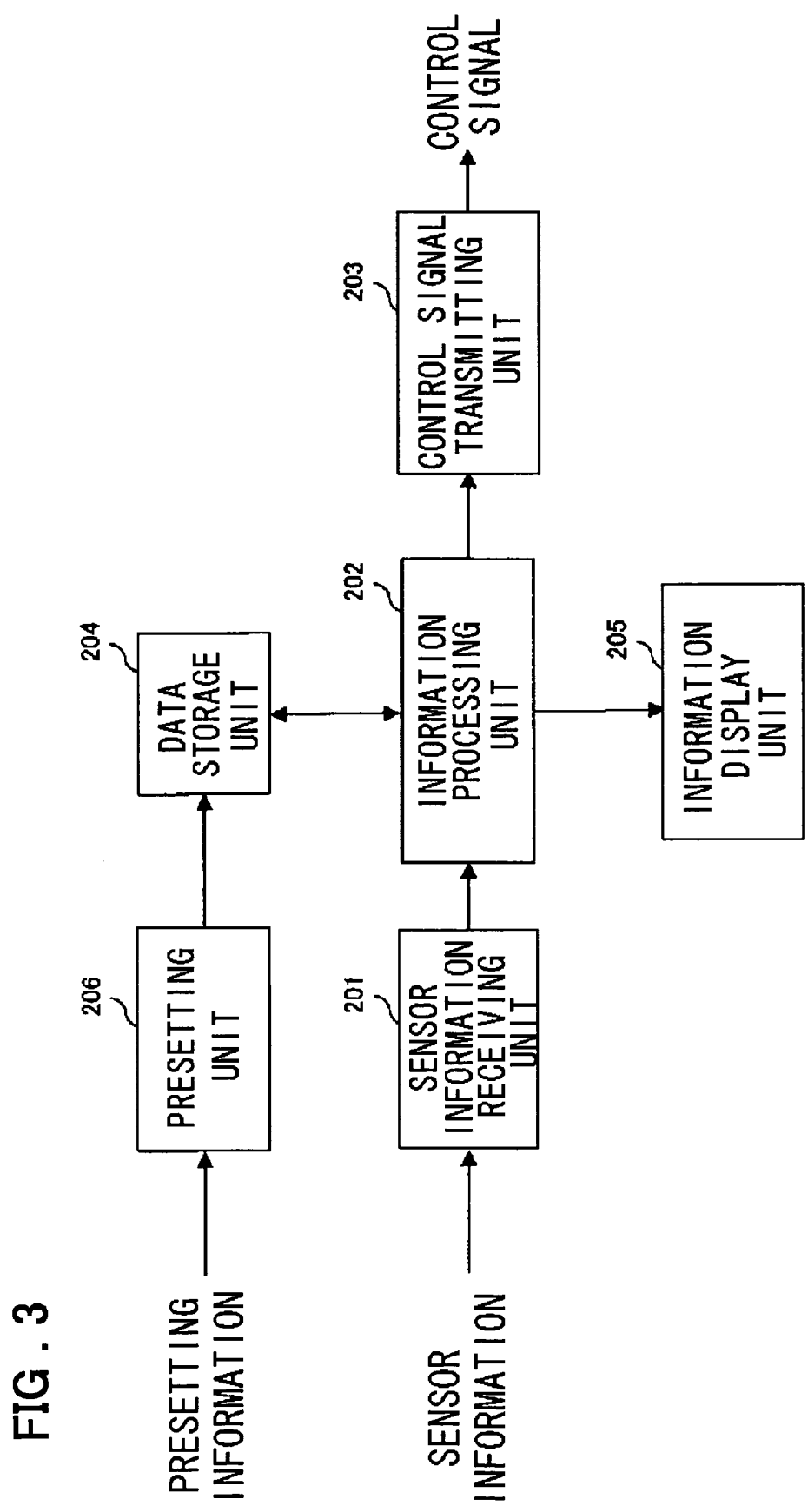
FIG. 3 is a block diagram showing an example of a portable terminal 20 of FIG. 1.

FIG. 3 is a block diagram showing functions of the portable terminal 20. A sensor information receiving unit 201 receives information which is transmitted from the self-contained sensors 10-1 through 10-n. An information processing unit 202 is capable of determining and controlling the states of devices 30 (air-conditioner, television set, audio system and illumination units) to be controlled based upon the received information and conditions preset by a presetting unit 206 and of learning a way of determining the state of operation of the device 30 to be controlled from the history of information from the self-contained transmission sensors 10-1 through 10-n and/or the history of changes in operation states of the device 30 to be controlled, which is stored in a data storage unit 204.

A control signal transmitting unit 203 transmits a control signal from the information processing unit 202 to the device 30 to be controlled. IEEE 1394 for information home-appliances may be used as a communication protocol in this case. The data storage unit 204 stores the history of information from the self-contained sensors 10-1 through 10-n and the history of changes in operation states of device 30 to be controlled.

An information display unit 205 displays the sensor information from the self-contained sensors 10-1 through 10-n, the control conditions and control states of the portable terminal 20 and the operation states of the device 30 to be controlled. A presetting unit 206 conducts presetting of information accepted from the self-contained transmission sensors 10-1 through 10-n, designation of the device 30 to be controlled and presetting of an operation preset value of the device 30 (desired temperature if the device 30 is an air-conditioner). The device 30 to be controlled is a device, the operation of which is determined by the control signal from the portable terminal and may be an air-conditioner, illumination units, audio-visual system if the device is a home-appliance.

The self-contained sensor group 10 (sensors 10-1 through 10-n) is disposed in an artificial environment such as building or a natural environment and is adapted to convert one or a plurality of physical quantities (temperature or illumination) into electrical signals and to form sensor information including additional information such as a sensor ID, a synchronization signal for establishing synchronization and a transmitter ID in a frame structure shown in FIG. 2 for transmitting it to the portable terminal 20 by using an internal transmitter.

The portable terminal 20 which is carried or worn by the user 40 receives the sensor information at the sensor information receiving unit 201 for determining the operation state of the device 30 to be controlled in the information processing unit 202 at operation conditions (desired temperature) of the device 30 to be controlled which is preset by the sensor information presetting unit 206 based upon the history of information from the self-contained transmission sensor and the history of changes in operation states of the device 30 to be controlled (air-conditioner, audio-visual system and illumination units), which is stored in the data storage unit 204.

The control signal from the information processing unit 202 is transmitted to the device 30 to be controlled from the control signal transmitting unit 203. The protocol used in this case is IEEE 1394 used for controlling information home-appliances. If the device 30 to be controlled is an air-conditioner, it lowers or elevates the temperature of blown wind in response to the control signal from the control signal transmitting unit 203. Of course, a change in information from the self-contained transmitting sensor due to a change in the operation state of the device 30 to be controlled is stored in the data storage unit 204.

Figure 4:
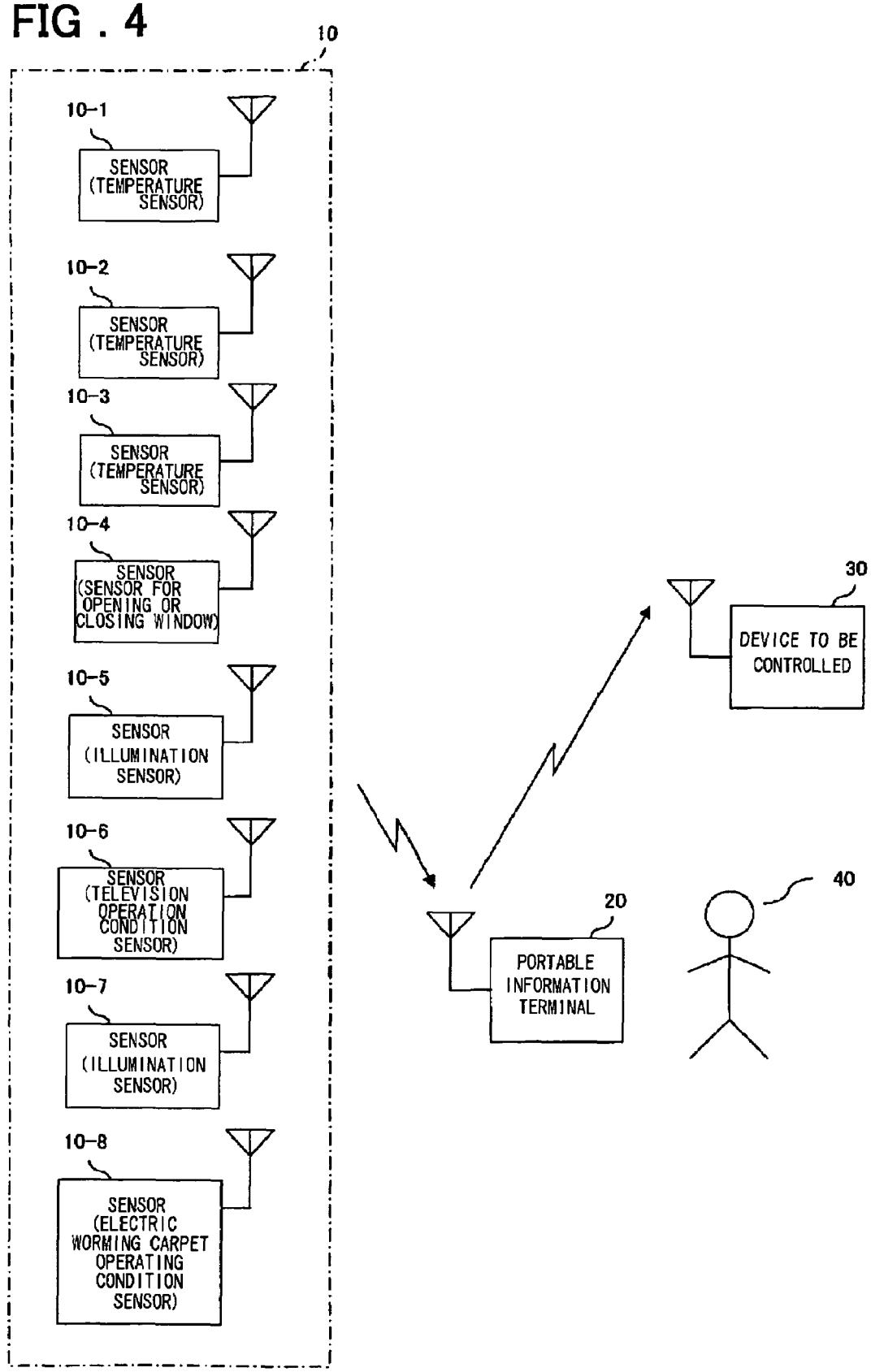
FIG. 4 is a diagram showing a detailed application in which one embodiment of the present invention is applied.

An operation for controlling the temperature of the air-conditioner and the illumination of the illumination lamp will be described as a detailed example with reference to FIGS. 1 and 4. FIG. 4 shows an example in which self-contained transmitting sensors 10-1 through 10-8 are disposed in a room where the user 40 is located. The self-contained transmitting sensors 10-1 through 10-3 are thermal sensors which are mounted in predetermined positions in a room for measuring the temperatures. The self-contained transmitting sensor 10-4 is a sensor for opening or closing the window. The self-contained transmitting sensor 10-5 is an illumination sensor for monitoring turn-on or off of an illumination lamp. The self-contained transmitting sensor 10-6 is a sound volume or illumination sensor for monitoring the operation state of the TV set.

The self-contained transmitting sensor 10-7 is an illumination sensor for measuring the illumination (or luminosity) on a potted plant. The self-contained transmitting sensor 10-8 is a thermal sensor for monitoring the operation of a warming carpet. The self-contained sensors 10-1 through 10-8 transmit sensor information on single object to be measured (temperature, illumination and humidity). One self-contained transmitting sensor may have a plurality of sensors which transmit a plurality of items of sensor information. In this case, sensor information can be selectively obtained from each self-contained transmitting sensor if which information is obtained from which of self-contained transmitting sensors is preset in the portable terminal 20.

The portable terminal 20 controls the operation of the air-conditioner based upon temperature information from the self-contained transmitting sensors 10-1 through 10-3 and 10-8 so that the temperature distribution in the room becomes that preset by the user 40. Accordingly, the distribution of the temperature in the room can be kept optimum. The portable terminal 20 controls the operation of the illumination lamp based upon the illumination information from the self-contained transmitting sensor 10-7 so that illumination on the potted plant becomes that preset by the user. Accordingly, an optimum illumination can be kept for the potted plant.

Figure 5:
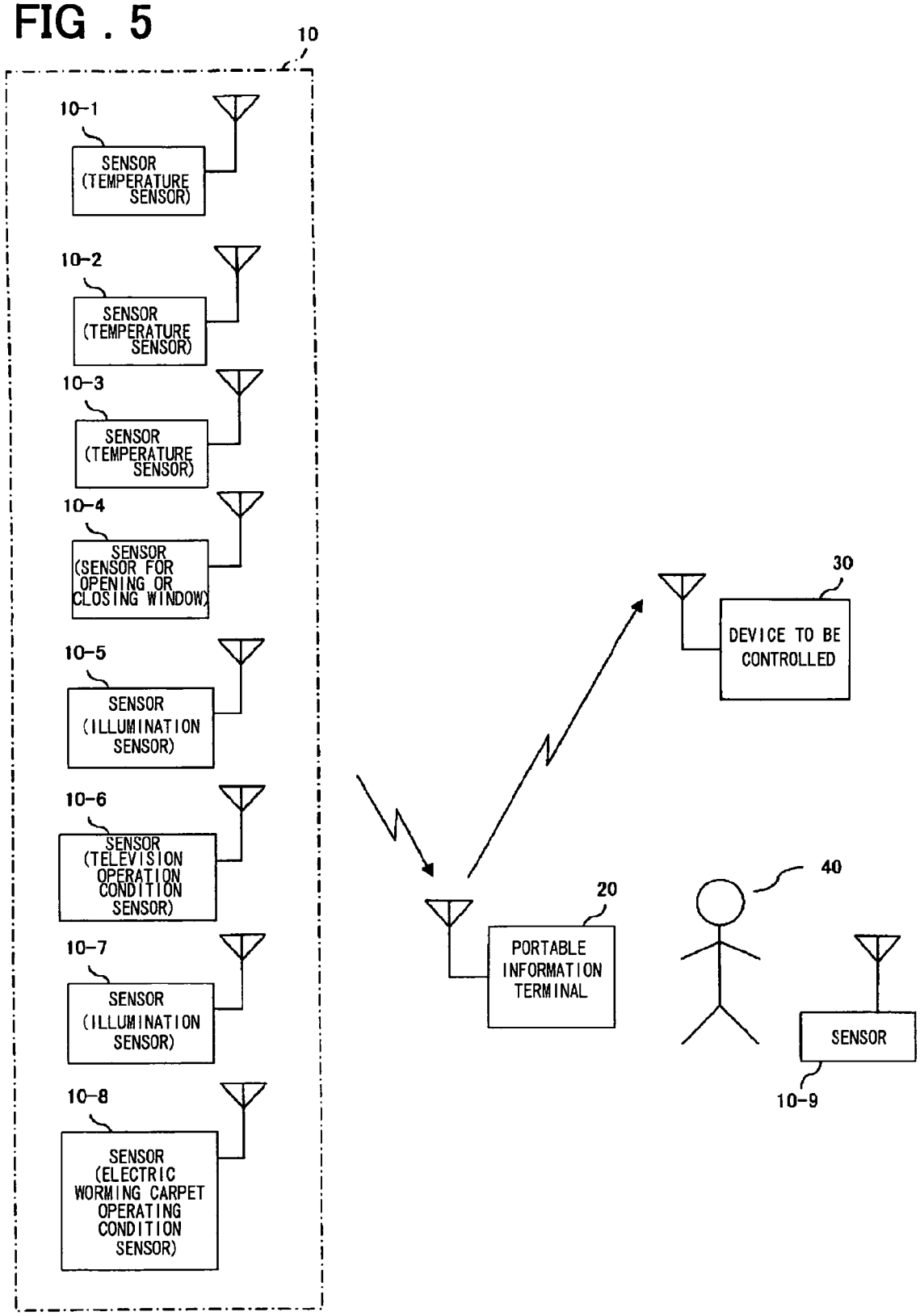
FIG. 5 is a diagram showing the configuration of a further embodiment of the present invention.

FIG. 5 is a view showing another embodiment of the invention. Components equivalent to those in FIG. 4 are designated by the same reference numerals. In this case, one of the self-contained transmitting sensors (sensor 10-9) is worn by the user 40. The temperature or illumination where the user 40 is located can be made optimum wherever the user moved in the room.

In particular, the sound volume from an audio system or the balance between the sound volumes of right and left speakers can be optimally controlled at a place where the user 40 is located. In this case, it is configured that the volume and/or phase of the sounds from a plurality of loud speakers can be controlled by obtaining information on the sound field using one or a plurality of sensors as the self-contained transmitting sensor 10-9.

In case of controlling of temperature and/or humidity, any one or all of the temperature, the direction of the blown wind, the humidity of the blown wind and the period of blowing can be controlled based upon the information on temperature and/or humidity and their history.

Figure 6:
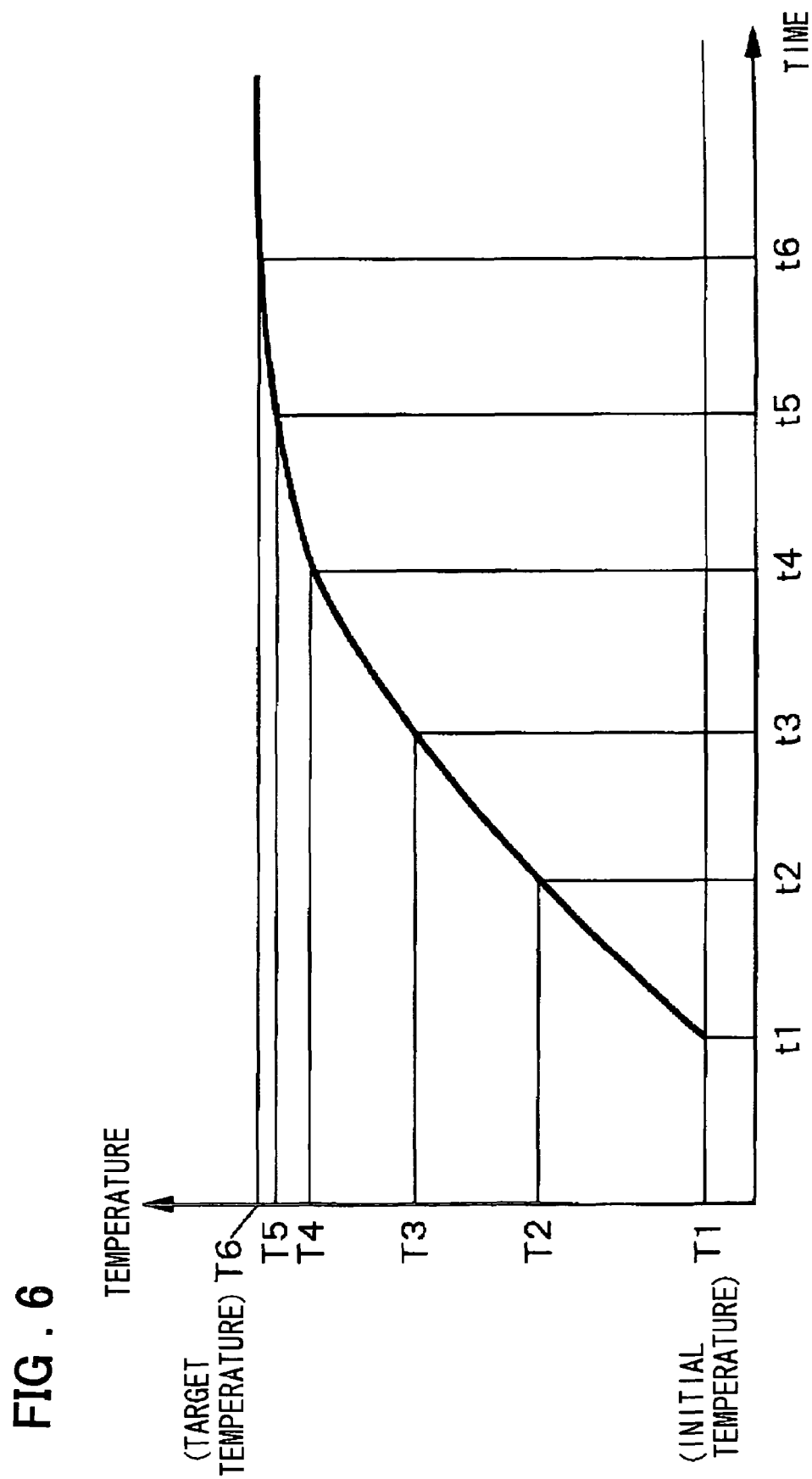
FIG. 6 is a graph explaining an example of temperature control of an air-conditioner of the embodiment of the present invention.

An example of control of the temperature of an air-conditioner will be described with reference to FIG. 6. A case in which power supply is turned on at an initial temperature T1 (time t1) and the temperature is controlled to a target temperature T6 will be considered. Since the difference between the temperature and the target temperature T6 is large at measuring times ti through t3, the room is warmed up at a high power. The difference between the temperature and the target temperature T6 is decreased at next measuring time t4 and supplied power is reduced at next measuring time t5 so that the temperature will not exceed the target temperature T6. In other words, control is made so that the power to be supplied to the air-conditioner is determined (a scheme to determine the operation state is learned) at time t4 based upon the power supplied to the air-conditioner at times t1 through t3 and changes in temperature (in accordance to a curve showing a history of operation state and history of changes in temperature detected by thermal sensor).

Figure 7:
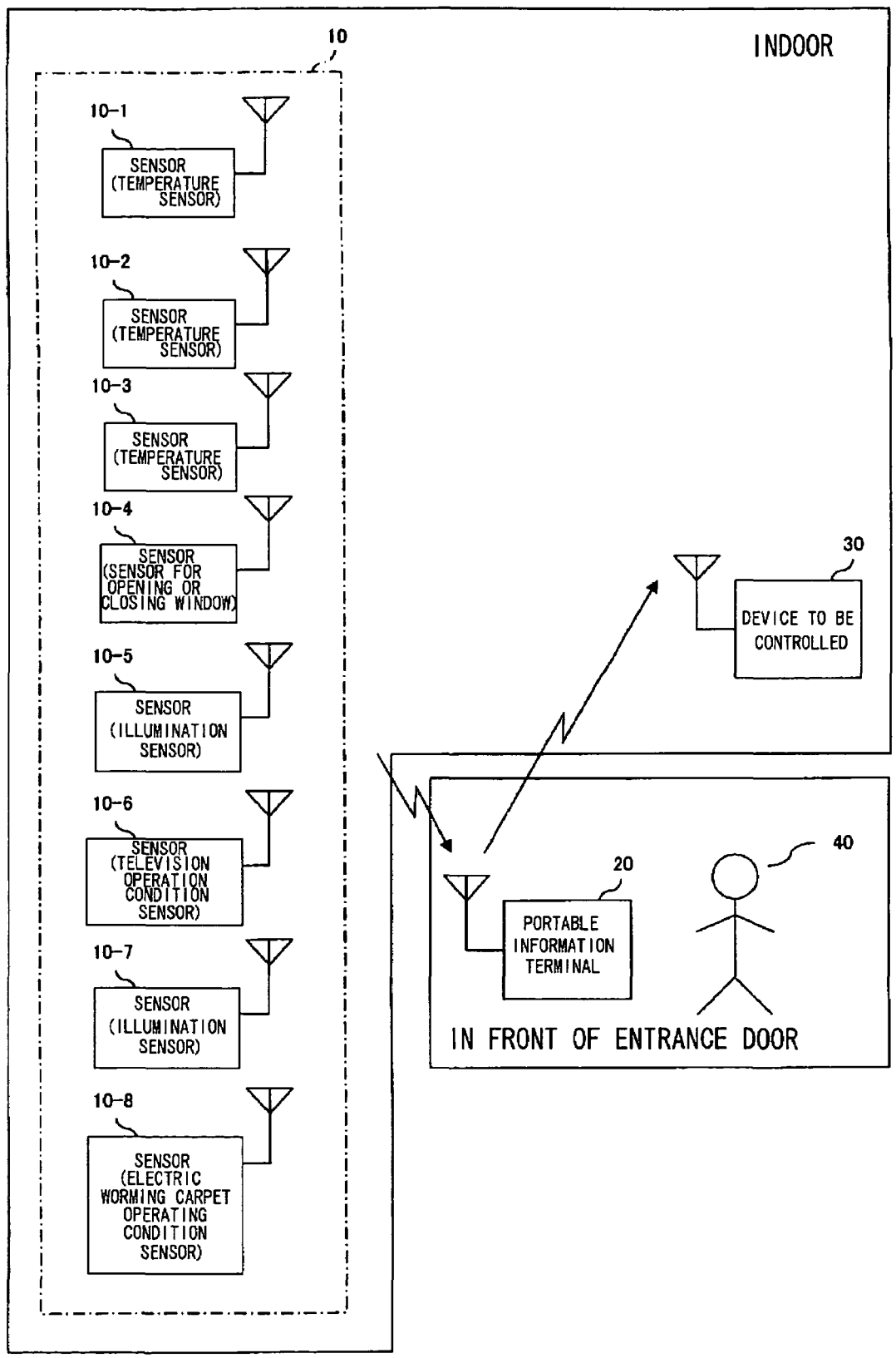
FIG. 7 is a diagram showing the configuration of a further embodiment of the present invention.

FIG. 7 is a view showing a further embodiment of the present invention. Components which are equivalent to those in FIGS. 4 and 5 are designated by the same reference numerals. A case is illustrated in which the present invention is applied for the confirmation of locking when the user 40 is away from home. When the user 40 goes away from home, he or she causes at the gateway the portable terminal to 20 display the closing or opening of a window (self-contained transmitting sensor 10-4), and operating states of illuminating lamp (self-contained sensor 10-5), television set (self-contained transmitting sensor 10-6) and electric warming carpet (self-contained transmitting sensor 10-8) to prevent forgetting of closing the window and turning off of the power of electric appliances.

Forgetting to turn off the illuminating lamp, TV set and to close the window can be determined by displaying on the portable terminal 20 the information on the illumination from the self-contained transmitting sensor 10-5, the information on the illumination of the display unit from the self-contained sensor 10-6 and the proximity information from the self-contained sensor 10-4. If the turning off of power is forgotten, power can be turned off by the portable terminal 20 at a remote place. Accordingly, necessity of walking up and down the room to confirm the locking of doors and turning off of power is eliminated.

Although the foregoing embodiment which is applied to an indoor artificial environment has been described, it is of course that the present invention is equally applicable to the outdoor natural environment.

The meritorious effects of the present invention are summarized as follows.

Since self-contained transmitting sensors are disposed in positions in an environment so that information from these sensors is collected by using a portable terminal for controlling devices to be controlled, the present invention provides an advantage that control of very fine environment presetting (temperature and illumination distribution) which users request is enabled.

The present invention also provides an advantage that necessity of wirings for power supply and information transmission is eliminated by incorporation of a solar cell or radio-transmitter in the self-contained transmitting sensor, so that the sensors may be disposed in any environment.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A physical quantity monitoring and control system, comprising:
   a sensor device having a sensor unit for detecting a physical quantity and a transmitter unit for wirelessly transmitting information related to said detected physical quantity; and
   a portable information terminal for receiving said information transmitted from said transmitter unit of said sensor device, and for generating a control signal to control an operation state of an object based on the received information, and for wirelessly transmitting the control signal to the object, said object separate and distinct from said portable information terminal, said operation state of said object affecting said physical quantity.

2. The physical quantity monitoring and control system as defined in claim 1, wherein said portable information terminal learns a scheme to determine said operation state based on said received information and a history of changes in said operation state.

3. The physical quantity monitoring and control system as defined in claim 1, wherein said portable information terminal comprises a display for displaying operation states of said object based on said received information.

4. The physical quantity monitoring and control system as defined in claim 1, wherein said portable information terminal comprises a display for displaying said received information.

5. A portable information terminal, comprising:
   a receiving device for receiving information related to a detected physical quantity that is wirelessly transmitted from a sensor;
   a processing unit for generating a control signal that controls an operation state of an object based on said received information, said operation state of said object affecting said physical quantity; and
   a transmitting unit for wirelessly transmitting the control signal to the object, said object separate and distinct from said portable information terminal.

6. The portable information terminal as defined in claim 5, wherein said portable information terminal learns a scheme to determine said operation state based on said received information and a history of changes in said operation state.

7. The portable information terminal as defined in claim 5, wherein said portable information terminal comprises a display for displaying operation states of said object based on said received information.

8. The portable information terminal as defined in claim 5, wherein said portable information terminal comprises a display for displaying said received information.

9. The portable information terminal as defined in claim 5, wherein said portable information terminal is a cellular phone.

10. The physical quantity monitoring and control system as defined in claim 1, wherein said portable information terminal learns a scheme to control said operation state of said object based on said received information and based on a history of changes in said operation state.

11. The portable information terminal as defined in claim 5, wherein said portable information terminal learns a scheme to control said operation state of said object based on said received information and based on a history of changes in said operation state.

12. The physical quantity monitoring and control system of claim 1,
   wherein the object comprises an air conditioner;
   wherein the physical quantity detected by the sensor unit is a temperature; and
   wherein the control signal generated by the portable information terminal allows for controlling the operation state of the air conditioner to cause the air conditioner to lower or elevate a particular temperature of blown wind.

* * * * *